United States Patent Office 3,441,581
Patented Apr. 29, 1969

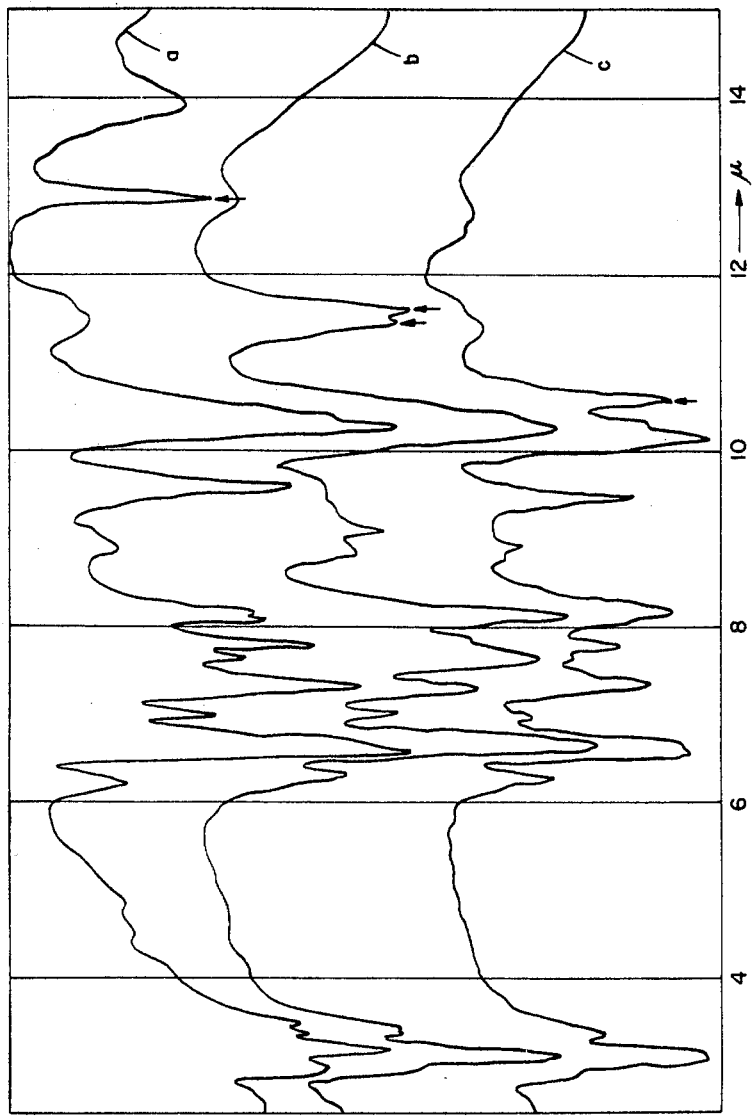

3,441,581
AMMONIA COMPLEX OF THE ZINC SALT OF ETHYLENE BIS-DITHIOCARBAMIC ACID
Hermann Windel, Frankenthal, Pfalz, and Ernst-Heinrich Pommer, Limburgerhof, Pfalz, Germany, assignors to Badische Anilin- & Soda-Fabrik Aktiengesellschaft, Ludwigshafen (Rhine), Germany
Filed Mar. 24, 1966, Ser. No. 537,202
Claims priority, application Germany, Mar. 27, 1965, B 81,209
Int. Cl. C07f 3/06; A01n 9/12
U.S. Cl. 260—429.9       1 Claim

ABSTRACT OF THE DISCLOSURE

The ammonia complex of the zinc salt of ethylene-bis-dithiocarbamic acid which contains 1 mole of ammonia per atom of zinc; uses thereof as fungicide.

---

The present invention relates to the zineb.1-$NH_3$ complex. It relates particularly to fungicidal compositions which contain this active substance and to methods of controlling fungus with these active substances.

It is an object of this invention to provide the zineb.1-$NH_3$ complex. Another object of the invention is to control fungus with this complex, the fungus being destroyed by using small amounts of the active substance.

It is known that salts of ethylene-bis-dithiocarbamic acid may be used for controlling fungi. In particular the zinc salt of this acid (hereinafter referred to as zineb) has proved very suitable in practice. It is also known that the ammonia complex of this salt containing two molecules of ammonia per atom of zinc may be used for the same purpose.

It is also known that zineb may be prepared from zinc oxide and ammonium ethylene-bis-dithiocarbamate in the presence of ammonia and may be used as a fungicidal active substance (cf. U.S. patent specification No. 2,-995,589).

We have now found that the ammonia complex of the zinc salt of ethylene-bis-dithiocarbamic acid which contains one molecule of ammonia per atom of zinc has a superior action in controlling fungi to that of comparable compounds. The ammonia complex of the zinc salt of ethylene-bis-dithiocarbamic acid which contains one molecule of ammonia per atom of zinc is a well-defined compound which differs clearly from the zinc salt of ethylene-bis-dithiocarbamic acid and the known ammonia complex of this salt with two molecules of ammonia per atom of zinc.

The accompanying drawing reproduces infrared absorption spectra for the three salts in question, namely (a) zineb, (b) zineb.1-$NH_3$ and (c) zineb.2-$NH_3$. The differences between them are evident. Particularly the absorption bands at 11.4 microns and 11.6 microns are characteristic for the new compound.

The complex may be prepared by a number of different methods.

For example 1 mole of ammonia per mole of complex may be removed from the zineb.2-$NH_3$ complex by acidification. The zineb.1-$NH_3$ complex may also be obtained by prolonged stirring of an aqueous suspension of zineb in an aqueous ammonia solution. Both of these methods have the disadvantage, however, that it is difficult to maintain the reaction of the desired zineb:ammonia ratio of 1:1. It is more advantageous to prepare the zineb.1-$NH_3$ complex by starting from a water-soluble salt of ethylene-bis-dithiocarbamic acid, for example the ammonium salt, reacting this with a water-soluble zinc salt, for example zinc chloride, and carrying out this reaction in the presence of about 1 mole of ammonia per mole of zinc salt. The use of a water-soluble zinc salt, for example zinc chloride or zinc sulfate, is preferred as the starting product for the production of the active substance.

The new compound may be prepared as follows:

A solution of 246 parts (parts by weight) of ammonium ethylene-bis-dithiocarbamate in 2,000 parts of water, to which 100 parts of 25% aqueous ammonia has been added, is allowed to flow in the course of half an hour simultaneously with a solution of 136 parts of zinc chloride dissolved in 2,000 parts of water into 1,000 parts of water while stirring at a temperature of 20° to 25° C. The whole is stirred for another hour after the reaction, the precipitate is separated, washed with water and dried at 40° C. The yield is 92% of the theory.

The invention is further illustrated by the following examples. They show that the zineb.1-$NH_3$ complex has better fungicidal action that the known zineb.2-$NH_3$ complex and zineb itself. Its action is particularly marked on grape mildew (*Plasmopara viticola*), but is also effective on other fungi, for example *Aspergillus niger*. It may be used mixed with other active substances, for example organic fungicides, or insecticidal active substances. The agent according to this invention may be processed with powdered extenders into dusts or with dispersing agents, wetting agents or adhesives into dispersable mixtures suitable for the production of sprays.

EXAMPLE 1

Finely ground mixtures of talc and active substance to which spores of the fungus *Aspergillus niger* have been added are dusted onto the surface of nutrient agar at the rate of 17 mg. of the mixture of active substance, talc and spores per square centimeter. Growth of the fungus is determined after the agar has been incubated for five days at 35° C.

In the following table, 1 denotes no fungus growth, 2 denotes slight fungus growth, 3 denotes medium fungus growth, 4 denotes vigorous fungus growth, 5 denotes a complete covering of fungus.

In the following table the first column gives the percentage of active substance in the talc mixture in percent; zineb (U.S. patent specification No. 2,995,589, Example 3); $NnNH_3$ denotes the zineb.1-$NH_3$ complex; $Zn2NH_3$ denotes the zineb.2-$NH_3$ complex.

TABLE

| Percent content | Zineb | Zineb (U.S. patent specification No. 2,995,589) | $ZnNH_3$ | $Zn2NH_3$ |
|---|---|---|---|---|
| 0.075 | 5 | 5 | 4 | 5 |
| 0.15  | 5 | 5 | 1 | 5 |
| 0.3   | 4 | 5 | 1 | 5 |
| 0.6   | 4 | 3 | 1 | 1 |
| 1.2   | 4 | 3 | 1 | 1 |
| 2.5   | 3 | 2 | 1 | 1 |
| 5     | 3 | 1 | 1 | 1 |
| 10    | 3 | 1 | 1 | 1 |

EXAMPLE 2

Leaves of potted grapevines of the variety Müller-Thurgau are sprayed with aqueous dispersions of finely ground formulations of 80% of active substance and 20% of sodium lignin sulphonate. After the spray coating has dried, the leaves are infected with a zoo-spore suspension of *Plasmopara viticola* (grape mildew). The plants are then kept at first for sixteen hours in a chamber saturated with water vapour and then for eight days in a greenhouse at temperatures of from 20° to 30° C. After this period, the plants are again placed in the moist chamber for sixteen hours to accelerate and intensify the sporaniophore ejection. The spore sites on the underside of the leaves are then counted. Untreated control plants serve for comparison. Injury to the leaves of the grapevines is not observed in these tests.

TABLE

| Active substance | Percentage of attacked leaves after spraying with an active substance liquor having the percentage strength: | | | |
|---|---|---|---|---|
| | 0.016 | 0.031 | 0.063 | 0.125 |
| Zineb | 82 | 36 | 25 | 19 |
| Zineb (U.S. patent specification No. 2,995,589) | 32 | 26 | 18 | 1 |
| Zineb.1-NH$_3$ | 15 | 10 | 2 | 0 |
| Zineb.2-NH$_3$ | 57 | 21 | 7 | 0 |
| Control (untreated) | 100% attacked leaves | | | |

We claim:
1. The ammonia complex of the zinc salt of ethylene-bis-dithiocarbamic acid which contains 1 mole of ammonia per atom of zinc.

References Cited

UNITED STATES PATENTS 2,604,484  7/1952  McCool _____ 260—429.9
2,995,589  8/1961  Leghissa _____ 260—429.9
3,346,605  10/1967  Windell et al.

FOREIGN PATENTS 161,728  8/1964  U.S.S.R.

OTHER REFERENCES

Chemical Abstracts, vol. 55, p. 23919c (1961).

TOBIAS E. LEVOW, *Primary Examiner.*

H. M. S. SNEED, *Assistant Examiner.*

U.S. Cl. X.R.
424—286, 289

U.S. DEPARTMENT OF COMMERCE
PATENT OFFICE
Washington, D.C. 20231

UNITED STATES PATENT OFFICE
CERTIFICATE OF CORRECTION

Patent No. 3,441,581             April 29, 1969

Hermann Windel et al.

It is certified that error appears in the above identified patent and that said Letters Patent are hereby corrected as shown below:

Column 2, line 45, "NnNH$_3$" should read -- ZnNH$_3$ --.

Signed and sealed this 21st day of April 1970.

(SEAL)
Attest:

Edward M. Fletcher, Jr.
Attesting Officer

WILLIAM E. SCHUYLER, JR.
Commissioner of Patents